United States Patent [19]
Meshbane et al.

[11] 3,906,293
[45] Sept. 16, 1975

[54] ELECTROPHORESIS TESTING APPARATUS

[76] Inventors: Alex Meshbane, 5 Patricia Ln., Syosset, N.Y. 11791; Frank Vilardi, 9 Brookstan Rd., Nesconset, N.Y. 11767

[22] Filed: Jan. 28, 1974

[21] Appl. No.: 437,055

[52] U.S. Cl............ 317/18 R; 317/9 AC; 204/299; 340/213 Q
[51] Int. Cl............................ H02h 3/00; H02h 5/04
[58] Field of Search ..... 317/9 A, 9 AC, 18 R, 40 R; 340/213 R, 213 Q, 411, 415; 204/299; 324/71 CP; 307/117, 118

[56] References Cited
UNITED STATES PATENTS

| | | |
|---|---|---|
| 1,907,845 | 5/1933 | Macrae et al. ................. 317/9 AC |
| 1,914,187 | 6/1933 | Whittaker ....................... 317/9 AC |
| 2,472,157 | 6/1949 | Gordon ........................... 317/9 AC |
| 3,558,981 | 1/1971 | Zocholl ........................... 317/18 R |
| 3,663,865 | 5/1972 | Stanback ......................... 317/18 D |
| 3,677,930 | 7/1972 | Meshbane et al................. 204/299 |
| 3,699,389 | 10/1972 | Holsinger ........................ 317/9 R |

*Primary Examiner*—J. D. Miller
*Assistant Examiner*—Patrick R. Salce

[57] ABSTRACT

Electrophoresis testing apparatus comprises an integrated electric shock and fire protection system which includes a door interlock system, leakage detection and coolant flow monitor system, and fire detection system operative to interrupt the supply of primary power to the high voltage power supply when a fault occurs. Also provided are fire extinguishing and fire alarm systems.

5 Claims, 5 Drawing Figures

ELECTROPHORESIS TESTING APPARATUS

BACKGROUND OF THE INVENTION

The present invention relates to an electrophoresis testing apparatus, and more particularly to an electrophoresis testing apparatus having a fully integrated electrical coolant flow, leak detection and fire protection system.

Electrophoresis testing apparatus generally comprises a rectangular acrylic tank inside of which are two liquid buffer compartments filled with conductive fluid. A sheet of paper extends from each compartment passing over the top of a rack used for holding the paper, whereby the paper is kept saturated and thereby electrically conductive. An electroconductive buffer solution saturates the paper to allow the conduction of electric current through the paper containing the substance to be tested.

In conventional electrophoresis testing systems the conductive liquid in the compartments is connected to one terminal of a high voltage power supply generally supplying about 2000–10,000 volts, with the buffer compartments serving respectively as the anode and the cathode. The current passes through the paper causing the test substance to migrate, the degree of migration determining analysis of the substance. Due to the high voltage circuitry in the housing of the electrophoresis equipment, significant electric shock and fire hazards are established.

It is therefore an object of the present invention to provide electrophoresis testing apparatus having a fully integrated electrical and fire protection system.

It is another object of the present invention to provide electrophoresis testing apparatus having an electrical interlock system on the door and tanks to provide electrical and fire safety therein.

It is a further object of the present invention to provide electrophoresis testing apparatus having a ground fault interruptor system to provide essential electrical safety from the primary and secondary voltages generated in the said apparatus.

It is yet another object of the present invention to provide electrophoresis testing apparatus having a fire alarm and carbon dioxide extinguishing system operative in conjunction with electrical fault and fire sensing circuitry.

SUMMARY OF THE INVENTION

In accordance with the principles of the present invention, in an electrophoresis testing apparatus having an enclosure connected to a high voltage power supply adaptable for connection of its input terminals to an A.C. power source and high voltage output terminal means, tank means for containing electroconductive fluid, and enclosure doors permitting access to the interior of said enclosure, there is provided an electric shock and fire protection system comprising high voltage circuit means connected between said high voltage output terminal means and said electroconductive fluid in said tank means, and first switch means connected to said high voltage power supply input terminals. The electric shock and fire protection system is further provided with door interlock switch means operative to be rendered open and closed when the enclosure door is in the open and closed positions respectively and ground fault interrupter means operative to detect a ground fault in the A.C. power circuit means. The first switch means is operative in response to said door interlock switch means to interrupt the flow of power from A.C. power source to the high voltage input terminals when the enclosure door is in the open position. Also provided are leakage detection means operative to detect leakage of electroconductive fluid from the tank means, coolant flow indicator means operative to detect interruption of flow of coolant liquid circulating through the electrophoresis plate, and fire detection means operative to detect a rapid temperature rise within the enclosure indicative of a fire therein. The first switch means is operative, respectively in response to the leakage detection means, and the coolant flow indicator means and the fire detection means to interrupt the flow of power from the A.C. power source to the high voltage input terminals. There is further provided carbon dioxide fire extinguishing means operative in response to the fire detection means for discharging carbon dioxide into the interior of said enclosure to extinguish any fire occuring within the interior of the enclosure. Also provided are rack lifting aids to facilitate the raising and lowering of paper loaded racks to and from the tanks and to suspend the paper holding racks over the tanks to allow the fluid to drip from the paper into the tanks when the paper is being dried at the end of the electrophoresis process.

Further objects, features and advantages of the present invention will become apparent upon consideration of the following detailed description in conjunction with the drawings, in which:

DETAILED DESCRIPTION OF THE INVENTION

Figure 1:
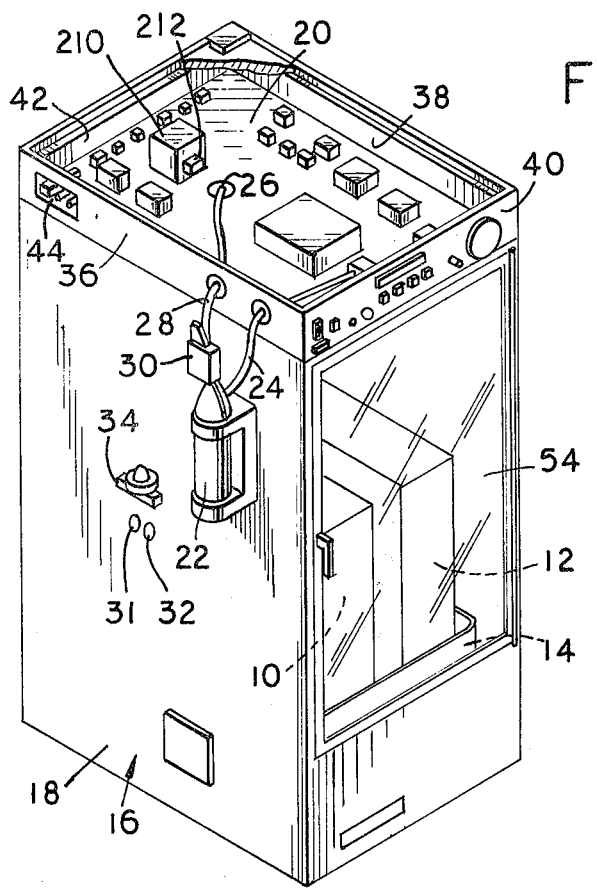
FIG. 1 is a perspective view of the electrophoresis testing apparatus of the present invention, and in particular the enclosure thereof.

Referring now to FIG. 1, there is shown the electrophoresis testing apparatus of the present invention which is in the form of an integrated unit connected to a high voltage power supply and a pair of tanks 10, 12 holding an electro-conductive fluid such as a saline solution and provided with a catch basin reservoir 14 enclosed in a housing 16.

Figure 1A:
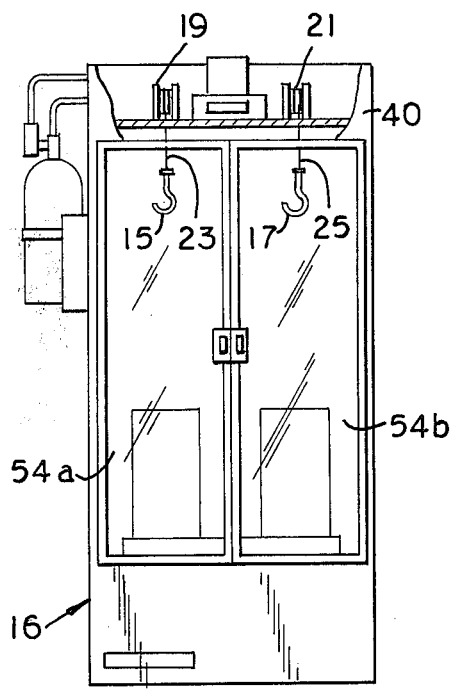
FIG. 1A is a front elevation view of the electrophoresis testing apparatus of FIG. 1 in modified form having a pair of front doors and provided with rack lifting aids, with the top panel partially broken away to reveal the rack lifting reels.
Figure 2:
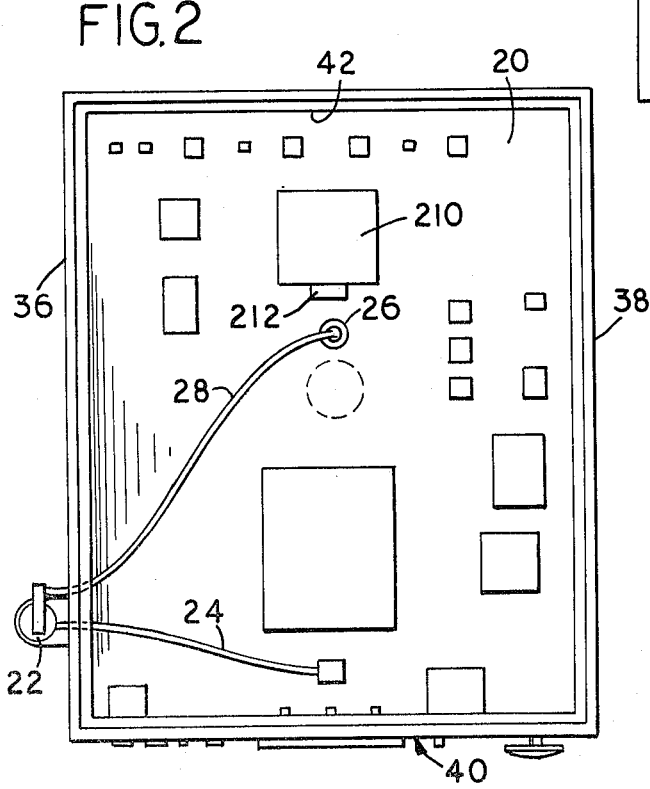
FIG. 2 is a top plan view of the electrophoresis testing apparatus enclosure of FIG. 1.

The housing 16 is preferably of sheet metal construction comprising interlocking wall and ceiling panels 18, 20 provided with a fire resistant vinyl coating on all surfaces and a front door 54 to permit access to the interior of housing 16. As shown in FIG. 1A, housing 16 may be provided with double front doors 54a, 54b to facilitate access to the interior of housing 16 and with rack lifting hooks 15, 17 which are suspended from reels 19, 21 by lines 23, 25. Rack lifting hooks 15, 17, which may conveniently be manually operable, are operative to raise and lower paper-loaded racks (not shown) to and from tanks 10, 12 and to suspend the paper-holding racks over tanks 10, 12 to allow fluid to drip from the paper (not shown) into their respective tanks 10, 12 when the paper is being dried at the end of the electrophoresis process.

A fire alarm and carbon-dioxide extinguishing system comprising a carbon-dioxide tank and valve assembly 22 is mounted at the upper end of side wall panel 18. The carbon-dioxide extinguishing system further includes a carbon-dioxide conduit pipe 24 extending from the top end of tank 22 through top wall panel 20 and terminating in a nozzle (not shown) into the interior of housing 16.

The fire detection and extinguishing system of the present invention includes a rate of temperature rise fire detector 26 mounted on the inside surface of ceiling panel 20, and is operatively connected to carbon dioxide tank 22 through a pneumatic actuating tube 28 and manual release unit 30. Fire detector 26, which is a standard type commercially available rate of temperature rise detector is operative independently of any supply of electrical power thereto. Detector 26 comprises a pneumatic actuated control head including a manual actuation pin; the latter being operative to manually override the pneumatic actuator and discharge the carbon dioxide from tank 22, if the circumstances so warrant. One suitable type of rate of temperature rise detector is know as Norris Industries – Type A-60421-1.

In electrophoresis testing apparatus, the organic cooling liquids in tanks 10 and 12 must be cooled to a constant temperature to remove at least some of the heat produced by the high voltage current passing through the paper and for this purpose coolant water is circulated through the tanks. The inlet 31, outlet 32 and visible flow indicator 34 for such coolant are located on sidewall panel 18.

The electrical control circuitry forming the fire detection and extinguishing system and the interlock system of the present invention is located on the top surface of ceiling panel 20 which is enclosed by top panel sidewalls 36, 38, front panel wall 40 and rear panel wall 42. Electrical connection to the high voltage power supply is made through bulkhead fittings 44.

In view of the high operating voltages employed in the electrophoresis system of the present invention, i.e. about 5000 volts, it is essential that adequate provision be made for protection from fire and electric shock to operating personnel. For this reason the cooling system must be monitored to ensure that no leaks or failure occurs and to actuate an alarm if and when such failure occurs. To protect against electrical shock hazards, a power supply interlock system is provided, as hereinafter described in greater detail.

Figure 3:
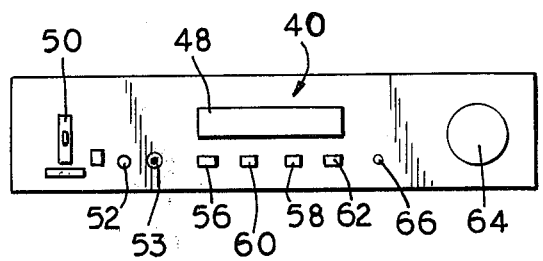
FIG. 3 is a front elevation view of the front control panel of the electrophoresis testing apparatus of FIG. 1.

In order to obtain a clearer understanding of the operation of the electrophoresis system of the present invention and in particular the safety features thereof providing protection against electrical shock and fire hazards, reference is made to FIG. 3 showing the front control panel and the following description of the functions of the elements thereof.

Referring to FIG. 3, lighted panel 48 will illuminate to read "Caution-System in Operation" when power is being supplied to the power supply. Power to light panel 48 is fed from a 24 volt A.C. interlock power return to the electrical control circuitry.

The ground-fault interrupter represented by indicator 50 is operative to protect the operator of the present electrophoresis apparatus from primary shock hazard due to leakage from the primary line to ground. Thus, if the operator touches any primary line and ground, interrupter 76 will shut off primary power within about 25 milliseconds after the passage of 5 milliamperes of current through the body of the operator, which limit is deemed to be well within human tolerance. If any exposed primary line lead should touch any of the grounded panels, the interrupter will shut off the primary power and ground fault interrupter indicator 50 will light to indicate a fault condition in the primary power system.

Safety key 52 is operative, when actuated, to interrupt the power supply's interlock system thereby preventing power from reaching the high voltage section. Enclosure lamp switch 53 is an override switch that turns on the housing interior lamp which is ordinarily off when the housing front door 54 (or double doors 54a, 54b) is shut.

Lighted pushbutton switch 56 serves as a coolant water flow indicator and lighted panel 58 serves as an interlock fault indicator. Thus, when coolant water is not flowing, switch 56 will light and cause interlock fault indicator panel 58 to light because the flow switch breaks the interlock line to disable the power supply turn-on. When the coolant water flow is at least 0.25 gallons per minute lighted panel 58 goes off. The operator may test the operation of this circuit by depressing switch 56, and if satisfactory, switch 56 and interlock fault indicator panel 58 will light.

Lighted pushbutton switch 60 serves as a level indicator for basin 14 to indicate when basin 14 contains liquid from a probable leak and will illuminate when the liquid level reaches about two inches in depth at which time the interlock circuitry will be interrupted causing interlock fault indicator 58 to illuminate thereby interrupting the flow of power to the primary power supply.

Lighted panel 62 and fire bell 64 are operative, in response to fire detector 26 to illuminate and sound an alarm respectively when carbon-dioxide is discharged from carbon-dioxide tank 22 thereby signaling the existence of a fire within the housing 16 which is being extinguished and also actuating solenoid 212 to thereby close exhaust vent 210.

Reset button 66, normally depressed, will extend when carbon-dioxide is released from carbon-dioxide tank 22 in response to the actuation of the pneumatic switch arm, which turns on a relay to break the interlock line thereby shutting off primary power to the system and closes a remote alarm circuit. The relay closes the bell alarm circuit and causes closure of the ventilator shaft damper to cut off the exhaust thereby making the fire extinguishing effect of the carbon-dioxide more efficient.

Figure 4:
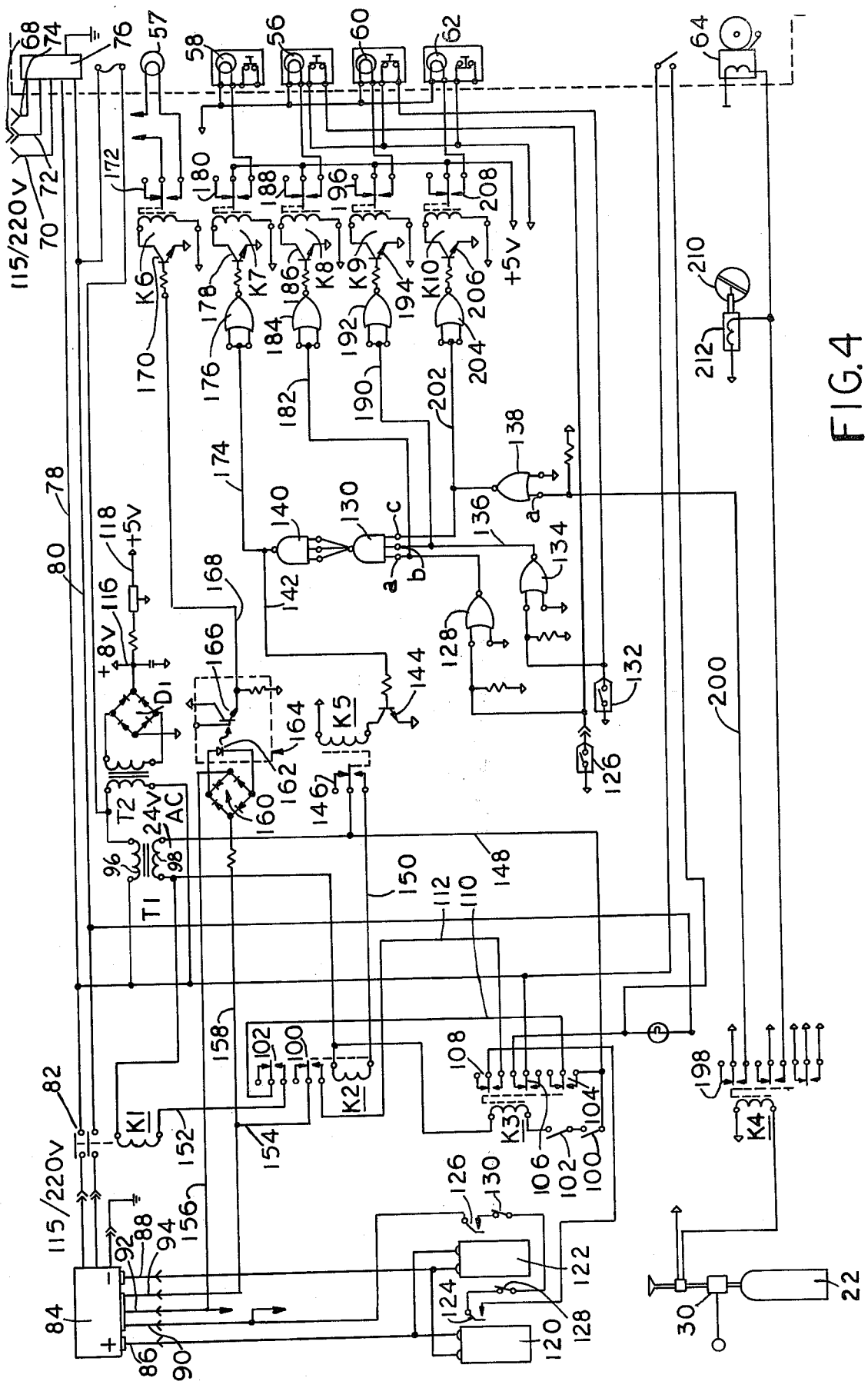
FIG. 4 is an electrical schematic diagram of the electrical and fire protection system in the electrophoresis testing apparatus of the present invention.

Reference is now made to FIG. 4 showing the electronic control circuitry for achieving the above-described functions of the system. Terminal 68 which provides an entry terminal for 115/220 V.A.C. for the system, comprises leads 70, 72 and 74 serving as the power, neutral and ground leads respectively which are connected to ground fault interrupter 76. As described above, interrupter 76 is operative to monitor input line 70 with respect to return lead 72 and if the difference therebetween exceeds 5 m.a., thus suggesting the existing of leakage (i.e. ground fault) somewhere in the circuitry of FIG. 4, interrupter 76 will shut off power to the complete system.

The output of interrupter 76 is fed via leads 78 and 80 through closed contacts 82 of contactor $K_1$ to power supply 84 which includes a pair of high voltage output leads 86, 88 and output leads 90, 92, 94 which are the control, power, ground and return leads. In addition to contactor $K_1$, the 24 V.A.C. interlock system comprises interlock contactors $K_2$ and $K_3$ both of which must be closed in order for contactor $K_1$ to close and allow power to be provided to power supply 84. The 24 V.A.C. power supply system comprises a transformer $T_1$ having its primary winding 96 connected across power line leads 78, 80 and a secondary winding 98 providing 24 V.A.C. for the various contactor coils in the interlock control circuit as shown.

Transformer $T_2$ and rectifier bridge $D_1$ provide +8 and +5 volt supplies for the transistor and integrated circuit AND gates circuitry at terminals 116 and 118 respectively.

As shown in FIG. 4, energization of contactor $K_1$ requires actuation of both contactors $K_2$ and $K_3$, when left and right door interlock switches 100, 102 are closed, contactor $K_3$ closes, thereby closing contacts 104, 106 and 108 (shown normally open). Closure of contact 104 provides 24 V.A.C. power to leads 110 and 112. High voltage leads 86 and 88 are connected to tanks 120 and 122 which are respectively provided with normally open tank interlock switches 124 and 126 and normally closed temperature switches 128 and 130. Temperature switches 128, 130 remain closed until the temperature at tanks 120 and 122 reaches 100° F at which time these switches open thereby interrupting the supply of power to contacts 108 of contactor $K_3$ via lead 124.

When the coolant water is flowing, coolant flow switch 126 is closed thereby providing an ON signal at the output of gate 128 which is applied to input terminal $a$ of gate 130. Assuming that there is no significant leakage into the basin, basin level indicator switch 132 will remain closed thereby providing an ON signal at the output of gate 134 which is applied to input terminal $b$ of gate 130 via lead 136. Similarly, the absence of an input signal at terminal $a$ of gate 138 due to the inactuated condition of relay $K_4$ produces an ON signal on input terminal $c$ of relay 130 whereby gate 130 produces an output which is applied through gate 140 and lead 142 to turn transistor 144 ON and energize relay $K_5$. Energization of relay $K_5$ closes its contacts 146 thereby supplying power to the coil of relay $K_2$ from the coil of relay $K_3$, switches 102, 100, lead 148, closed contacts 146 and lead 150.

Actuation of relay $K_3$ supplies power through relay contacts 104 and lead 110 to contacts 102 of relay $K_2$. Actuation of relay $K_2$ supplies power to the coil of relay $K_1$ through contacts 102 and lead 152 thereby actuating relay $K_1$ and causing relay contacts 82 to close thereby supplying power to power supply 84.

Furthermore, actuation of relay $K_3$ causes closure of relay contacts 108 thereby returning power to terminal 94 of power supply 84 from terminal 90 thereof via switches 126, 130, 128, 124, lead 124, relay contact 108 lead 112, relay contacts 100 and lead 154.

Output leads 92 and 94 of power supply 84 are connected via leads 156 and 158 respectively to the input of bridge rectifier 160 which has a photodiode 162 connected across the output thereof for sensing the presence of voltage on output lead 94 thereby indicating that tanks 120 and 122 have their interlock switches 124, 126 closed. Photo isolator 164 comprises photodiode 162 and phototransistor 166 which receives light from photodiode 162 and produces an output signal which is applied via lead 168 to transistor 170 which drives relay $K_6$ thereby applying a 24 V.A.C. signal via contacts 172 to interlock fault indicator 57 when either of tank interlock switches 124 or 126 are opened. Furthermore, gate 140 will produce a signal at lead 174 which is applied through gate 176 to transistor 178 to actuate relay $K_7$ which, through its contacts 180 causes interlock fault indicator 58 to light whenever either coolant flow switch 126, basin level switch 132 indicates a fault or carbon dioxide tank 22 indicates that it has discharged. Closure of coolant flow switch 126 provides a signal through gate 128, lead 182, gate 184 to transistor 186 which drives relay $K_8$ which, via its contacts 188 causes coolant flow indicator 56 to light.

The opening of normally closed float level switch 132 provides a signal through gate 134, lead 190, gate 192, to transistor 194 which, in turn drives relay $K_9$ to actuate its contacts 196 thereby causing basin level indicator 60 to light.

Actuation of relay $K_4$ by discharge of carbon dioxide tank 22 causes actuation of its contacts 198 thereby providing a signal on lead 200 which is applied to gate 138 whose output is applied through lead 202 to gate 204. The output of gate 204 is applied to transistor 206 which drives relay $K_{10}$ to actuate its contacts 208 thereby causing fire system indicator 62 to light. Actuation of release unit 30 by actuation of relay $K_4$ energizes solenoid 212 thus causing damper 210 to close and block off the exhaust port. This action increases the carbon dioxide displacement, i.e. preemption, of air within the enclosure 16 thus facilitating the extinguishing of the fire within enclosure 16. In addition, solenoid actuated ventilation means (not shown) may be connected to relay $K_4$ for exhausting fumes, vapors and odors from enclosure 16.

Although the invention has been described with reference to a particular embodiment thereof, it is to be understood that this embodiment is merely illustrative of the application of the principles of the invention. Numerous modifications may be made therein and other arrangements may be devised without departing from the spirit and scope of the invention.

What is claimed is:

1. In an electrophoresis testing apparatus adaptable for connection to an external power source and having an enclosure connected to a high voltage power supply having input terminals and high voltage output terminal means, tank means for containing electroconductive fluid and at least one enclosure door permitting access to the interior of said enclosure; an electric shock and fire protection system comprising ground fault interrupter means operative to detect a ground fault in said electric shock and fire protection system having its input terminal means adaptable for connection to said external A.C. power source and output terminal means, high voltage circuit means connected between said high voltage output terminal means and said tank means, first switch means having input terminal means and output contact means operative to selectively connect said high voltage power supply input terminals to said ground fault interrupter output terminal means, door interlock switch means operative to be rendered into open and closed conditions when said enclosure door is in the open and closed positions respectively, said first switch means being operative in response to said door interlock switch means to interrupt the flow of power from said power source through said ground fault interrupter means to said high voltage input terminals when said enclosure door is in the open position; low voltage power supply means comprising input and output terminals, said low voltage output terminals being connected to said ground fault interrupter output terminals, said first switch means input terminal means comprising a pair of input terminals with one of said first switch means input terminals connected to one of said low voltage output terminals; second switch means comprising input terminal means and output contact means connected to the second of said first switch means input terminals, whereby said first switch means is operative to interrupt the flow of power from said power source to said high voltage input terminals in response to said second switch means; said door interlock switch means comprising output contact means connected to said second switch output contact means whereby said second switch contact means is operative in response to said door interlock switch means to interrupt the flow of power from said low voltage power supply means to said first switch means to thereby cause interruption in the flow of power from said external power source to said high voltage power supply input terminals; and third switch means comprising input terminal means and output contact means connected to said second switch means input terminal means, said second switch means being operative in response to said third switch means output contact means to interrupt the flow of power from said low voltage supply terminals to said first switch means input means.

2. Electric shock and fire protection system as defined in claim 1 including AND gate means having output terminal means connected to said third switch means input terminal means, said third switch means being operative in response to said AND gate output terminal means to interrupt the flow of power from said low voltage supply output terminals to said second switch means input terminal means to thereby cause interruption of the flow of power from said low voltage supply output terminals to said first switch means input terminals thereby causing said first switch means output contact means to interrupt the flow of power to said high voltage supply input terminals.

3. Electric shock and fire protection system as defined in claim 2 including fire detection means operative to detect fire occurring within said enclosure, fire extinguishing means operative in response to said fire detection means to extinguish said fire, and fire extinguishing detection means operative to detect actuation of said fire extinguishing means connected to said AND gate input means, whereby said AND gate output means is operative in response to said fire detection extinguishing means to produce and apply a fire output signal to said third switch means input means to cause interruption of the flow of power from said external power source to said high voltage supply input terminals.

4. Electric shock and fire protection system as defined in claim 2 including tank leak detection means operative to detect leakage of electroconductive fluid in said tank means connected to said AND gate means input terminal means, said leakage detection means being operative to produce and apply a leakage output signal to said AND gate input terminal means, said AND gate means being operative in response to the application thereto of said leakage output signal to provide an AND gate output signal to said third switch means input terminal means thereby causing interruption of the flow of power from said external power source to said high voltage supply input terminals.

5. Electric shock and fire protection system as defined in claim 2 including coolant flow switch means operative to monitor the flow of coolant in said electrophoresis apparatus having its output connected to said AND gate input means, said coolant flow switch means being operative to produce and apply coolant flow signal to said AND gate means input terminal means upon occurrence of a failing in said coolant flow whereby said AND gate means is operative in response to said coolant flow signal to provide an AND gate output signal to said third switch means input terminal means thereby causing interruption of the flow of power from said external power source to said high voltage supply input terminals.

* * * * *